US008706905B1

(12) United States Patent
McGlaughlin (10) Patent No.: US 8,706,905 B1
(45) Date of Patent: Apr. 22, 2014

(54) METHOD AND SYSTEM FOR ROUTING INFORMATION IN A NETWORK

(75) Inventor: Edward C. McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 347 days.

(21) Appl. No.: 12/859,690

(22) Filed: Aug. 19, 2010

Related U.S. Application Data (60) Provisional application No. 61/236,408, filed on Aug. 24, 2009.

(51) Int. Cl.
G06F 15/173 (2006.01)

(52) U.S. Cl.
USPC ......................................................... 709/238

(58) Field of Classification Search
USPC ......................................................... 709/238
See application file for complete search history.

(56) References Cited

U.S. PATENT DOCUMENTS

| | | | |
|---|---|---|---|
| 7,773,629 B1 * | 8/2010 | Dropps et al. | 370/471 |
| 7,778,157 B1 * | 8/2010 | Tawri et al. | 370/216 |
| 8,151,318 B1 * | 4/2012 | DeSanti et al. | 726/3 |
| 8,351,448 B1 * | 1/2013 | McGlaughlin | 370/419 |
| 2004/0049580 A1 * | 3/2004 | Boyd et al. | 709/226 |
| 2004/0088538 A1 * | 5/2004 | Isip et al. | 713/153 |
| 2004/0151174 A1 * | 8/2004 | Del Signore et al. | 370/389 |
| 2004/0151188 A1 * | 8/2004 | Maveli et al. | 370/398 |
| 2005/0018673 A1 * | 1/2005 | Dropps et al. | 370/389 |
| 2006/0023708 A1 * | 2/2006 | Snively et al. | 370/389 |
| 2006/0023726 A1 * | 2/2006 | Chung et al. | 370/398 |
| 2006/0034302 A1 * | 2/2006 | Peterson | 370/401 |
| 2006/0153187 A1 * | 7/2006 | Agrawal et al. | 370/389 |
| 2006/0165119 A1 * | 7/2006 | Dugan et al. | 370/466 |
| 2006/0168382 A1 * | 7/2006 | Dugan et al. | 710/241 |
| 2007/0083625 A1 * | 4/2007 | Chamdani et al. | 709/223 |
| 2008/0095152 A1 * | 4/2008 | George et al. | 370/389 |
| 2008/0201458 A1 * | 8/2008 | Salli | 709/223 |
| 2009/0092141 A1 * | 4/2009 | Banerjee | 370/397 |
| 2009/0106771 A1 * | 4/2009 | Benner et al. | 719/313 |
| 2009/0307330 A1 * | 12/2009 | Allen et al. | 709/216 |
| 2010/0085981 A1 * | 4/2010 | Gupta et al. | 370/419 |
| 2010/0100878 A1 * | 4/2010 | Otani | 718/1 |
| 2010/0115132 A1 * | 5/2010 | Hirata et al. | 709/245 |
| 2010/0250785 A1 * | 9/2010 | Shin et al. | 710/3 |
| 2011/0044344 A1 * | 2/2011 | Hudson et al. | 370/395.53 |
| 2011/0296230 A1 * | 12/2011 | Chen et al. | 714/3 |
| 2012/0233491 A1 * | 9/2012 | Chen et al. | 714/3 |
| 2012/0290750 A1 * | 11/2012 | Kawaguchi | 710/74 |
| 2012/0297381 A1 * | 11/2012 | Ambat et al. | 718/1 |
| 2014/0029608 A1 * | 1/2014 | Ayandeh | 370/355 |

* cited by examiner

Primary Examiner — Imad Hussain (74) Attorney, Agent, or Firm — Klein, O'Neill & Singh, LLP (57) ABSTRACT

Method and system for a network is provided. The system includes a computing system operationally coupled to a first switch via a first adapter; a first storage system operationally coupled to the first switch via a second adapter; and a second switch operationally coupled to the first switch and to a second storage system. The second switch allocates addresses from an address range to the first adapter and the second adapter such that the first switch is able to route information between the computing system, the first storage system and the second storage system. The first switch upon receiving a frame from the second switch uses a dual stage selection mechanism for determining a port for routing the frame to the first storage system and to the computing system.

23 Claims, 7 Drawing Sheets

METHOD AND SYSTEM FOR ROUTING INFORMATION IN A NETWORK

CROSS-REFERENCE TO RELATED APPLICATION

This patent application claims priority to U.S. Provisional Patent Application Ser. No. 61/236,408 entitled "Method and System for Local Storage Attachment" filed on Aug. 24, 2009, the disclosure of which is incorporated herein in its entirety.

TECHNICAL FIELD

The present invention relates to networks.

BACKGROUND

Network switches and adapters are commonly used for network communication. These switches and adapters are typically used to handle network traffic from network devices and storage traffic from storage devices. Continuous efforts are being made towards designing and building "converged" switches and adapters that can handle both, network traffic and storage traffic. Continuous efforts are also being made to efficiently use existing network and storage infrastructure with the converged devices.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages.

In one embodiment, a system is provided. The system includes a computing system operationally coupled to a first switch via a first adapter; a first storage system operationally coupled to the first switch via a second adapter; and a second switch operationally coupled to the first switch and to a second storage system.

The second switch allocates addresses from an address range to the first adapter and the second adapter such that the first switch is able to route information between the computing system, the first storage system and the second storage system.

The first switch upon receiving a frame from the second switch uses a dual stage selection mechanism for determining a port for routing the frame to the first storage system and to the computing system.

Furthermore, the first switch uses a first routing mechanism and a second routing mechanism for selecting a port to route a frame that is received from the computing system, where the first routing mechanism is based on a destination identifier and the second routing mechanism is based on a source identifier.

In yet another embodiment, a first switch operationally coupled to a computing system via a first adapter, to a first storage system via a second adapter and to a second switch that is operationally coupled to a second storage system is provided. The first switch includes a plurality of ports that are assigned an address range allocated by the first switch such that the first switch is able to route information between the computing system, the first storage system and the second storage system.

The first switch upon receiving a frame from the second switch uses a dual stage selection mechanism for determining a port for routing the frame to the first storage system and to the computing system.

Furthermore, the first switch uses a first routing mechanism and a second routing mechanism for selecting a port to route a frame that is received from the computing system, where the first routing mechanism is based on a destination identifier and the second routing mechanism is based on a source identifier.

In another embodiment, a method for routing information in a system having a first switch operationally coupled to a computing system via a first adapter, to a first storage system via a second adapter and to a second switch that is operationally coupled to a second storage system is provided. The method includes allocating addresses from an address range to the first adapter and the second adapter such that the first switch is able to route information between the computing system, the first storage system and the second storage system.

The method further includes receiving a frame from the second switch at the first switch; using a dual stage selection mechanism for determining a port for routing the frame to the first storage system and to the computing system; and using a first routing mechanism and a second routing mechanism for selecting a port to route a frame that is received by the first switch from the computing system, where the first routing mechanism is based on a destination identifier and the second routing mechanism is based on a source identifier.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

The following definitions are provided as they are typically (but not exclusively) used in the networking and storage environment, implementing the various adaptive aspects of the present invention.

"D_ID" means a destination identifier in a frame header. In the Fibre Channel standard, D_ID is in a Domain-Area-Port address format. Domain is a unique domain name of a Fabric, Area is unique area name within the domain and Port is a unique port identifier (Port_ID). For virtual ports NP_IV is used as a unique identifier.

"Fabric" means a structure or organization of a group of switches, target and host devices (NL_Port, N_ports etc.).

"F_Port" means a port to which non-loop N_Ports are attached to a fabric and does not include FL_ports "FCID" means a Fibre Channel Identifier address. The address may be a 24-bit address and includes values for identifying a frame's Domain, Area and Port ID (Port Identifier).

"FL_Port": A L_Port that is able to perform the function of a F_Port, attached via a link to one or more NL_Ports in an Arbitrated Loop topology "L_Port": A port that contains Arbitrated Loop functions associated with the Arbitrated Loop topology.

"N_Port" means a direct fabric attached port, for example, a disk drive or a HBA.

NL_Port": A L_Port that can perform the function of a N_Port.

"NPIV" (or NP_IV) means N_Port ID Virtualization that allows one to assign various identifiers to a physical port in an environment that uses Fibre Channel. The NP_IV identifiers create a plurality of virtual ports (referred to as VN_Ports) for the physical port. NPIV is used by adapters to communicate with different devices using a same physical port with different virtual identifiers.

"Port" is a general reference to a N. Sub.—Port or F.Sub.—Port in the Fibre Channel and/or FCoE environment. A port in a generic sense means a module that includes logic and circuitry for handling incoming and outgoing traffic. A port can be a part of a switch, an adapter or other devices.

"S_ID" means a source address of a frame. The S_ID may be a 24-bit address field in a frame header.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality" as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or may correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

In one embodiment, a fabric switch can be used to allocate addresses to various devices attached to another switch, for example, a transparent switch. A two-stage steering mechanism is provided for handling traffic from a host system to a local attached storage, and for routing traffic from the host system to the fabric switch.

In yet another embodiment, both destination and source based addressing mechanism is used for routing information between a host system, local attached storage, and a fabric switch.

Figure 1A:
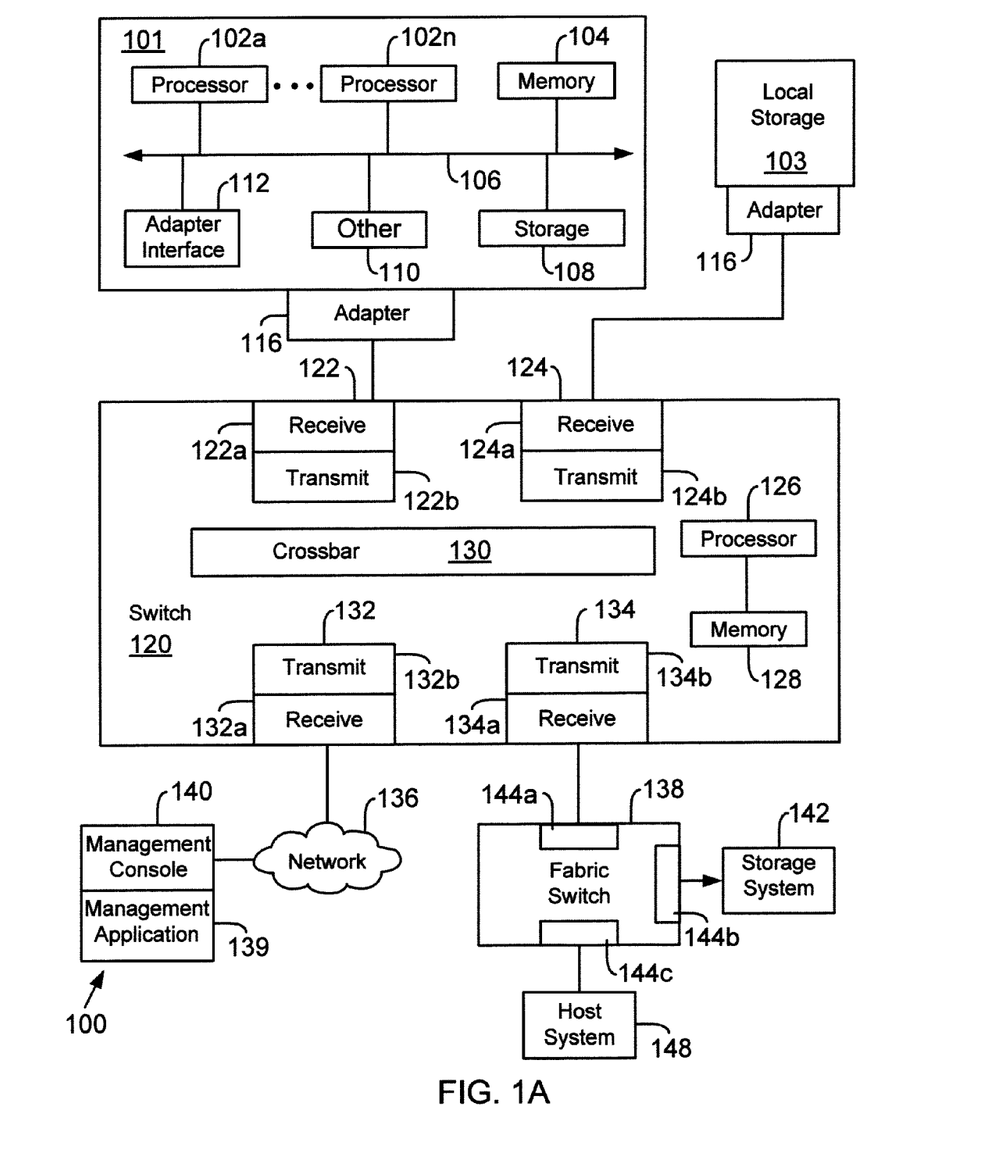
FIG. 1A is a block diagram of a system used according to one embodiment.

FIG. 1A is a block diagram of a system 100 including a computing system 101 (may also be referred to as "host system 101") and a local attached storage system 103 (may also be referred to as local attached storage 103 or "local storage 103") that is operationally coupled to a switch 120, according to one embodiment. Host system 101 may operate as a server and may issue read and write requests for reading and writing information to local storage 103 and remote storage 142.

Local attached storage 103 is considered "local" because it is directly attached to switch 120. In one embodiment, local attached storage 103 may be used to store code and data for critical host system 101 functionality. This information is easily accessible via switch 120 and one does not have to go through multiple network hops to access the information.

Host system 101 and local attached storage 103 each may use an adapter 116 to interface with switch 120. There may be other systems/components that may be placed between the aforementioned components but they are not germane to the embodiments disclosed herein.

Host system 101 may include one or more processors 102a-102n (jointly referred to as processor 102), also known as a central processing unit (CPU), interfacing with other components via a bus 106. Bus 106 may be, for example, system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind.

Host system 101 may also include a directly attached storage device 108, which may be for example a hard disk, a CD-ROM, a non-volatile memory device (flash or memory stick) or any other device. Storage 108 may store processor executable instructions and data, for example, operating system program files, application program files, and other files.

Host system 101 interfaces with a memory 104 that may include random access main memory (RAM), and/or read only memory (ROM). When executing stored computer-executable process steps from storage 108, the processor 102 may store and execute the process steps out of memory 104.

Host system 101 may also include other devices and interfaces 110, which may include a display device interface, a keyboard interface, a pointing device interface and others.

Host system 101 may also include an adapter interface 112 that allows the host system to interface with adapter 116. The link between adapter 116 and adapter interface 112 may be a peripheral bus, for example, a PCI, PCI-X or PCI-Express link.

Adapter 116 facilitates communication between host system 101, local attached storage 103, a storage system 142 and host system 148 via switch 120 and a fabric switch 138. Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel ("FC"). Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCoE) has been developed to handle both Ethernet and Fibre Channel traffic in a storage area network (SAN). This functionality would allow Fibre Channel to leverage 10 Gigabit Ethernet networks while preserving the Fibre Channel protocol.

Adapter 116 shown in FIG. 1A may be configured to operate as a FCoE adapter. QLogic Corporation, the assignee of the present application, provides one such adapter. Those of ordinary skill in the art will appreciate, however, that the present embodiments are not limited to any particular protocol.

System 100 also includes a management console 140 that may be connected to switch 120 via a network 136. Management console 140 may also be connected directly to switch 120 or fabric switch 138. Management console 140 may have a structure similar to host system 101. Management console 140 executes programmable instructions (shown as management application 139) for configuring switch 120, fabric switch 138 and other components of system 100.

Switch 120 may include a plurality of ports 122, 124, 132 and 134. Ports 122 and 124 are coupled to adapters 116. Port 132 is operationally coupled to a network 136 providing access to a management console 140. Port 134 is operationally coupled to fabric switch 138 and provides access to storage system 142 and host system 148.

Each of the plurality of ports include logic and structure to process incoming network and storage related traffic and then transmits the traffic to their destination. For example, each port includes a receive segment to receive and process a network packet or frame. Each port also includes a transmit segment that transmits a packet to another port. The receive segment and transmit segment for each port are shown as 122a/122b, 124a/124b, 132a/132b and 134a/134b. The ports may communicate with each via a crossbar 130.

Switch 120 may also include a processor 126 that has access to memory 128. Memory 128 may be used to store configuration information and firmware instructions that are used for controlling switch 120 operations.

In one embodiment, switch 120 may be a transparent switch. A transparent switch is able to proxy a connection between adapter 116 and switch 138. An example of one such transparent switch is provided in U.S. Pat. No. 7,340,167.

Fabric switch 138 maybe a legacy fabric switch that is connected to storage system 142, a host system 148 and to switch 120. Fabric switch 138 may include ports 144A, 144B and 144C coupled to switch 120, storage system 142 and host system 144C, respectively. Fabric switch ports may also include receive and transmit segments for receiving and transmitting information.

Figure 1B:
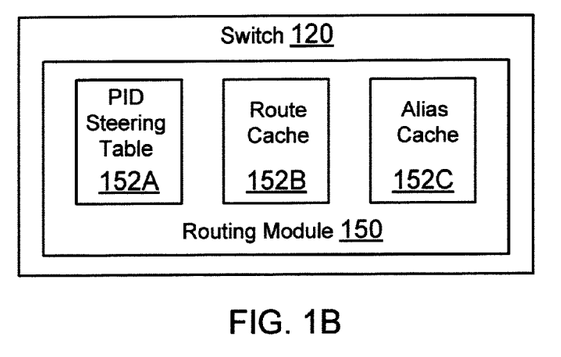
FIG. 1B shows an example of using a routing module, according to one embodiment.

FIG. 1B shows a routing module 150 used by switch 120 for processing frames, according to one embodiment. Routing module 150 includes a port identifier group (PID) steering table 152A, a route cache 152B and an alias cache 152C. PID steering table 152A includes frame steering information that is described below in detail. It is noteworthy that more than one PID steering table may be used to implement the various embodiments. For example, a steering table may be used for each area field, as described below in more detail. Both route cache 152B and alias cache 152C also include routing information as described below in more detail.

Figure 1C:
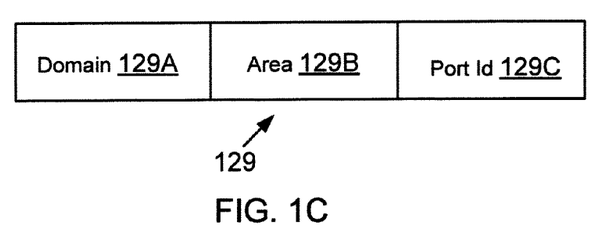
FIG. 1C shows an example of an address format for a frame header, used according to one embodiment.

Before describing the various embodiments of the present invention, the following describes an example of a frame format that may be used for communication between the various elements of system 100 in general and by switch 120 and fabric switch 138 in particular. The frame format is shown as 129 and includes a Domain value 129A, an Area value 129B and a Port_ID (port identifier) 129C. In one embodiment, format 129 complies with the Fibre Channel and FCOE addressing schemes.

The Domain value (may also be referred to as Domian_ID) 129A includes the upper 8 bits of a 24-bit Fibre Channel frame address. Domain_ID 129A includes one or more Fibre Channel switches that have the same Domain_ID for all N_Ports and NL_Ports within or attached to switches. If there is more than one switch in the Domain, then each switch within the Domain is directly connected via an Inter-Switch Link (ISL) to at least one other switch in the same Domain.

The area value (may also be referred to as Area_ID 129B) comprises the middle 8 bits of a 24-bit Fibre Channel address. The Area_ID 129B applies either to (a) one or more N_Ports within and attached to a Fibre Channel switch; or (b) an Arbitrated Loop of NL_Ports attached to a single FL_Port.

The Port_ID 129C comprises the lower 8 bits of a 24-bit Fibre Channel address. The Port_ID 129C applies to either (a) a single N_Port or virtualized N_Port within a Domain/Area, or (b) the valid arbitrated loop physical address (AL_PA) of a single NL_Port or FL_Port on an Arbitrated Loop.

Figure 1D:
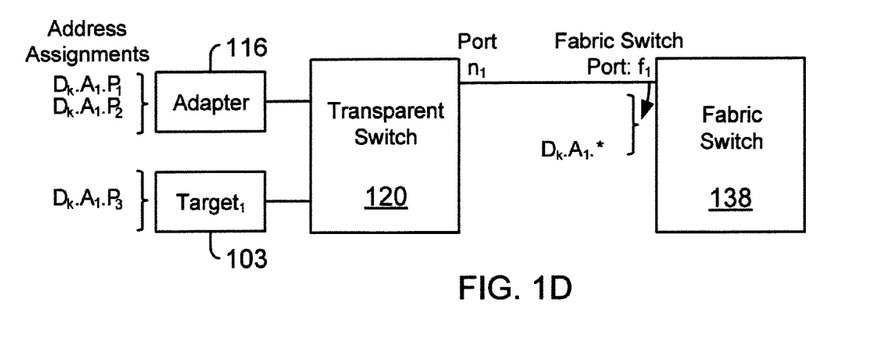
FIG. 1D shows an example of an address assignment, used according to one embodiment.

FIG. 1D shows an example of address assignment using the Domain/Area/Port_ID format, according to one embodiment. The fabric switch 138 assigns addresses to both the host system 101 and local attached storage (also referred to as target) 103. The addresses are shown as $D_k.A_1.P_1$ and $D_k.A_1.P_2$ for adapter 116 and $D_k.A_1.P_3$ for target 103.

In one embodiment, host system 101 using adapter 116 and a same NPIV connection can access target 103 and storage system 142 based on the process steps described below. Switch 120 routes information between host system 101, target 103 and storage system 142 and one does not have to rely on a fabric switch 138 to perform all the frame routing.

Figure 1E:
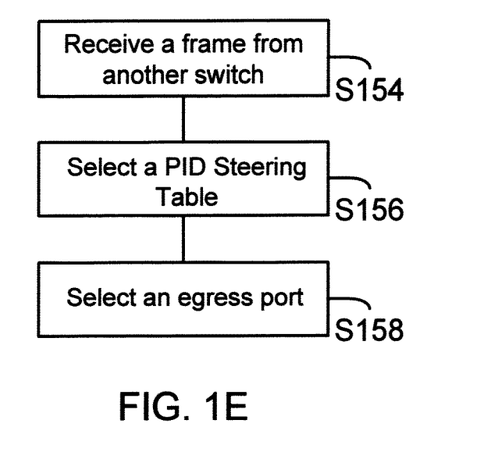
FIG. 1E-1H, and 2A-2B show examples of process flow diagrams, according to one embodiment.
Figure 1F:
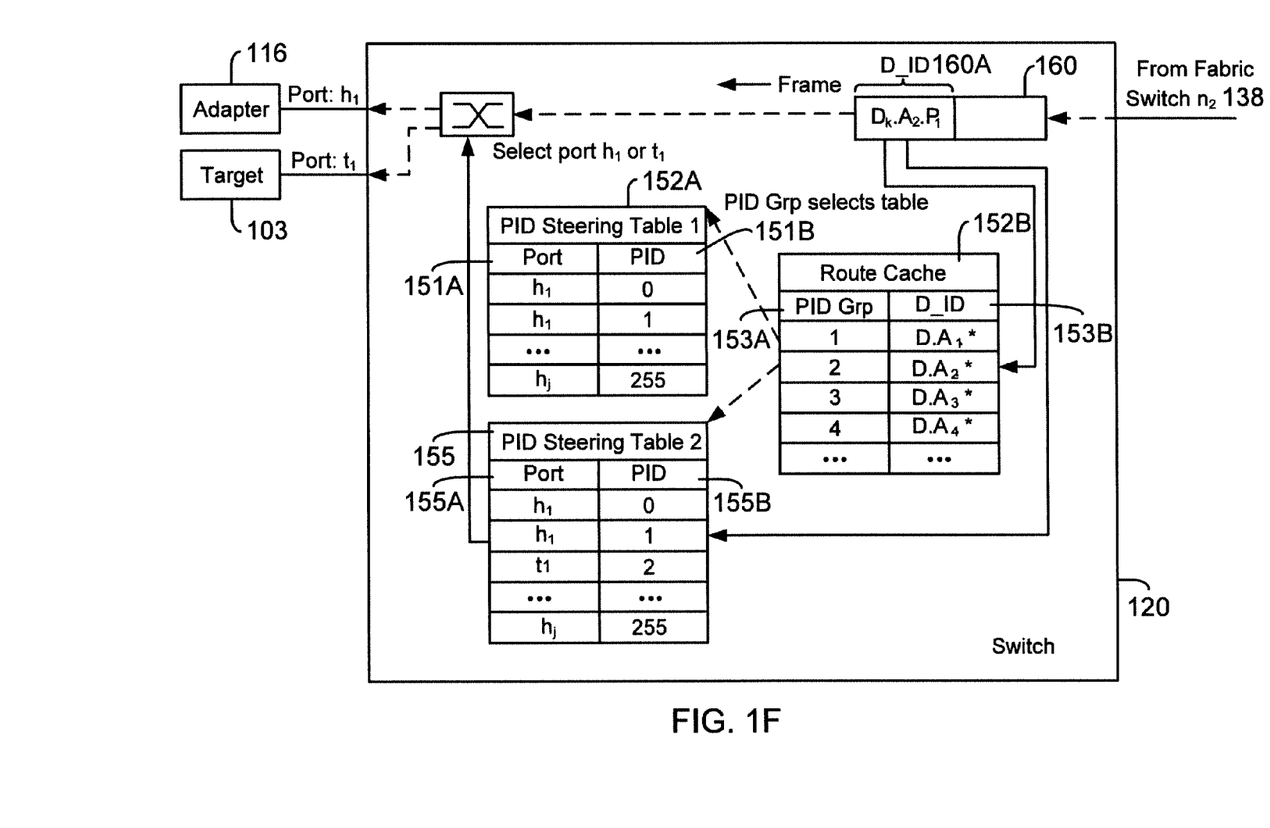

Process Flow:

FIG. 1E shows a process flow diagram for routing a frame received from fabric switch 138 to switch 120. This is illustrated in FIG. 1F. In block S154 a frame 160 is received from fabric switch 138. The D_ID value 160A is shown as $D_k.A_2.P_1$. In block S156, a PID steering table from amongst PID steering table I (152A) or PID steering table II (155), is selected. The route cache 152B may be used to select a PID steering table. Route cache 152E includes a first column 153A that stores PID group values corresponding to D_ID values stored in column 153B. The PID group value is used to select a PID steering table. Each PID steering table may be associated with a domain area value. For example, PID steering table 152A is associated with area A1 (i.e., $D.A_1$), while PID steering table 2 is associated with area A2 (i.e., $D.A_2$) value. In this example, the area field A2 is used to select PID group 2 which indexes to PID steering table 2 155.

In block S158, an egress port is selected from the PID steering table selected in block S156. As shown in FIG. 1F, PID steering table 152A includes columns 151A and 151B. Column 151A stores port values that identify a port and column 151B stores PID values that are used to match the PID field from the D_ID 160A.

PID steering table 155 includes columns 155A and 155B. Column 155A stores port values and column 155B stores PID values that are used to match the PID field from the D_ID 160A.

In the example of FIG. 1F, port h1 is selected from column 155A based on the Port_ID (PID) value of 1 that is included in D_ID 160A. If Port_ID (PID) value would have been 2, then port t1 would have been selected from PID steering table 2 155.

Figure 1G:
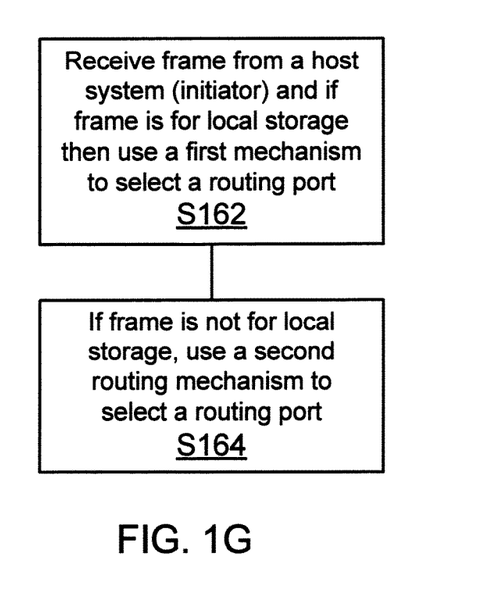
Figure 1H:
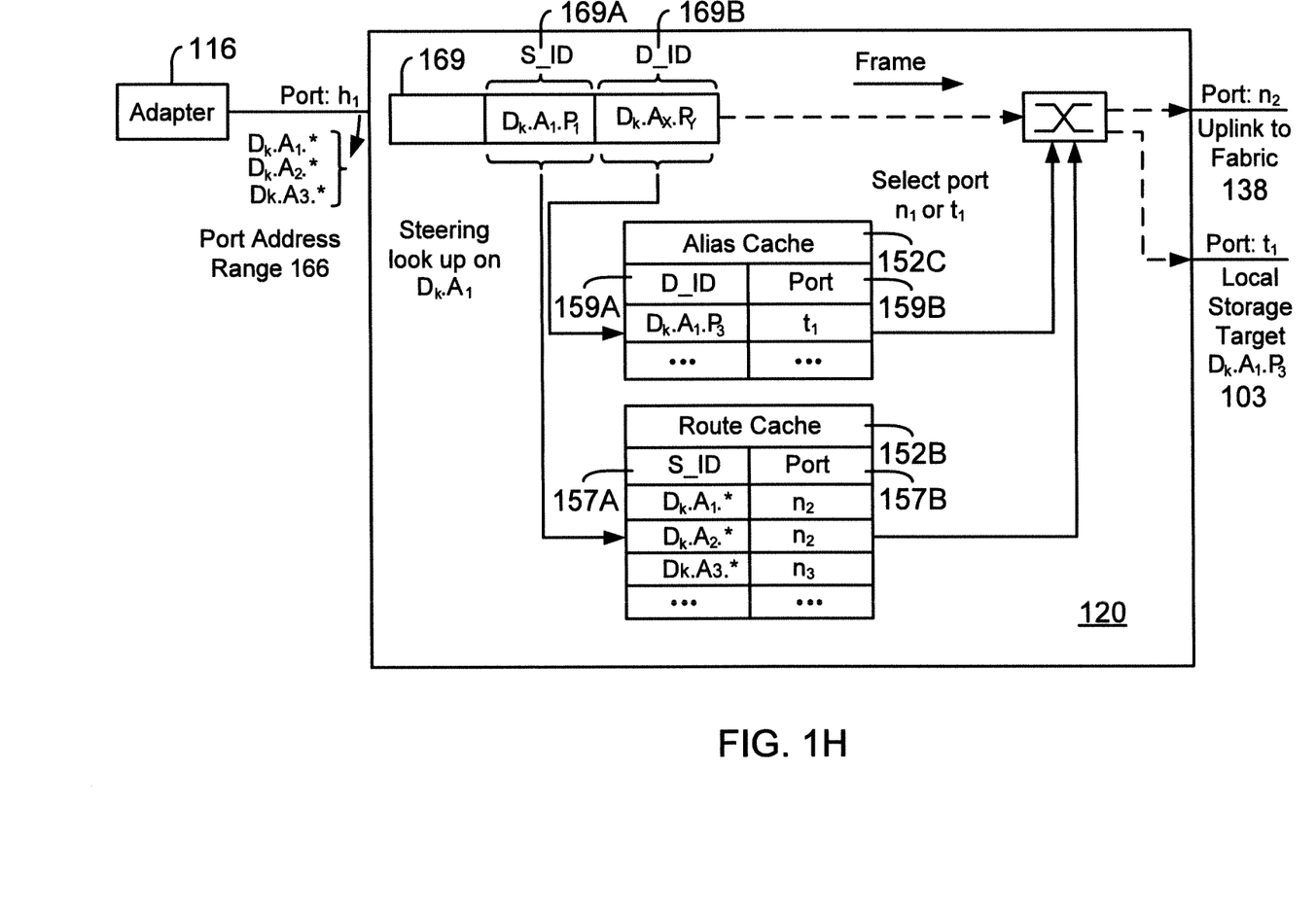

FIG. 1G shows a process flow diagram for routing frames that are received from an initiator, for example, adapter 116 of host system 101, according to one embodiment. An example of the process flow of FIG. 1G is illustrated in FIG. 1H.

The process begins in block S162 when a frame is received from host system 101 via adapter 116. An example of a frame is shown in FIG. 1H where frame 169 is received by a port h1 of switch 120. The frame includes S_ID 169A and a D_ID 169B.

A source port address range 166 is used by port h1 to route frame 169. The source address range 166 identifies different NPIV identifiers supported on a physical port h1 (also see FIG. 1D) using the following format: $D_k.A_1.*$, $D_k.A_2.*$ $D_k.A_3.*$. The * in port address range 166 (FIG. 1H) signifies different Port_IDs. This allows adapter 116 to communicate with different components, for example, fabric 138 and target 103 via switch 120 and port h1 to route frames to the proper destination.

In one embodiment, one can use the address range to spread out network load among different ports. By using NPIV, multiple data paths can be created for sending information from switch 120 to fabric switch 138 through ports that connect switch 120 to fabric switch 138.

Referring back to FIG. 1G, if frame 169 is for local storage 103, then a first routing mechanism is used to route the frame. An example of the first mechanism is the alias cache 152C as shown in FIG. 1H. Alias cache 152C may use two columns 159A and 159B. Column 159A may be used to store D_ID values, while column 159B may be used to store a port identifier for selecting a port.

When frame 169 is received by switch 120, the receiving port compares the D_ID in the frame with D_ID values of alias cache 152C. If there is a match, then a corresponding port is selected to route the frame. For example, as shown in FIG. 1G, if the D_ID is $D_k.A_1.P_3$ then port t1 is selected and the frame is routed to the local attached storage 103. If there is no match then, the process moves to block S164.

In block S164, if frame is not for local storage 103, then a second mechanism is used for routing the frame. An example of a second mechanism is the route cache 152B that includes columns 157A and 157B as shown in FIG. 1H. Column 157A stores S_ID values and column 157B stores port values corresponding to the S_ID values. The $D_k.A_2$ value is used to obtain port $n_2$ to route frame 169 to fabric switch 138.

Figure 2A:
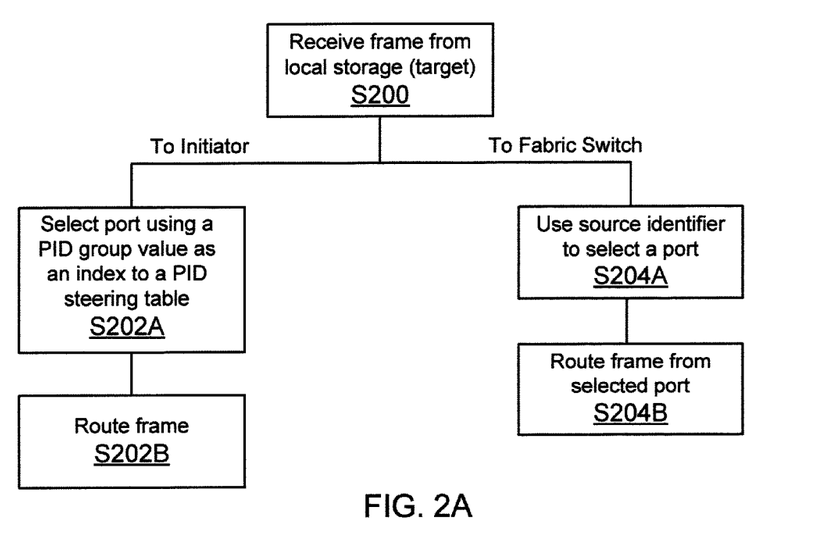
Figure 2B:
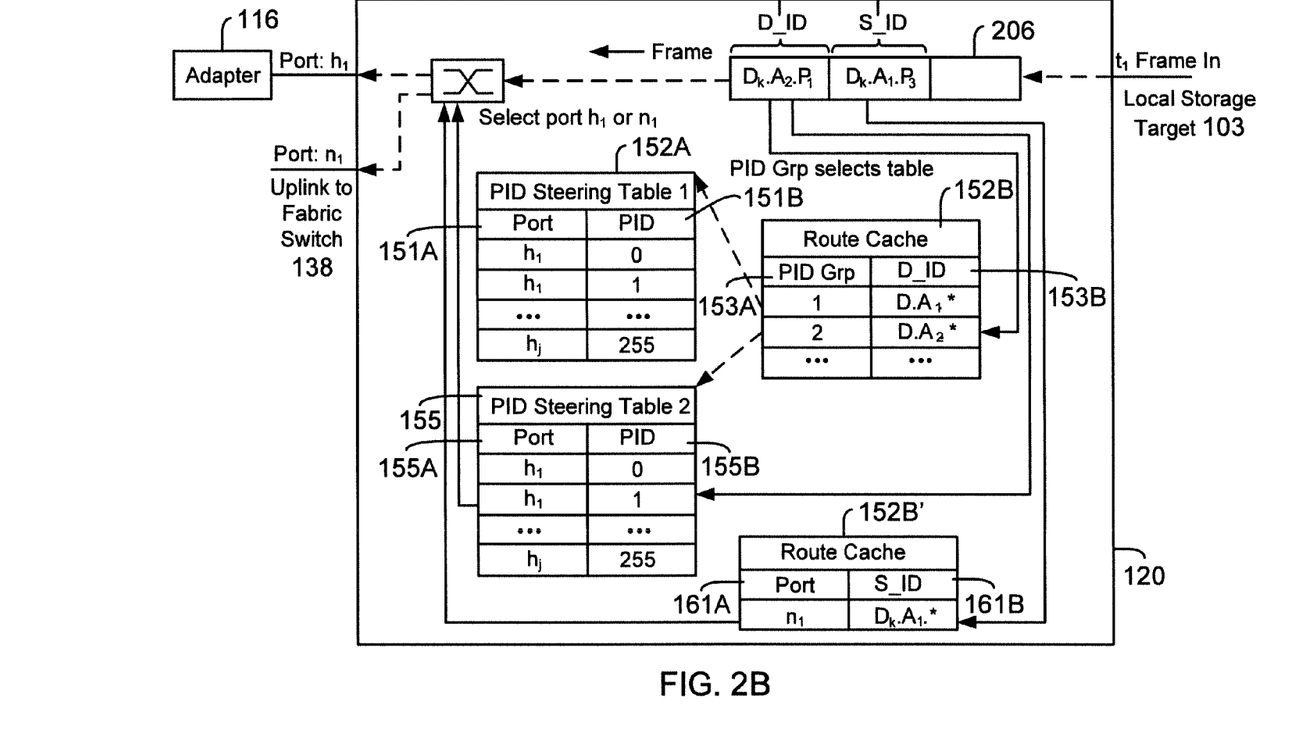

FIG. 2A shows a process flow diagram for routing frames from local storage 103 to adapter 116 and/or fabric switch 138 via switch 120, according to one embodiment. FIG. 2B shows an example of a structure that is used to implement the process flow of FIG. 2A, according to one embodiment.

The process begins in block S200 when a frame is received by switch 120 from local storage 103. The frame is shown as 206 in FIG. 2B. Frame 206 includes a D_ID 206A and a S_ID 206B. The D_ID 206A is shown as $D_k.A_2.P_1$ while the S_ID 206B is shown as $D_k.A_1.P_3$. If the frame is destined to adapter 116, then the process flow is shown in blocks S202A and S202B similar to the process flow diagrams described above.

In block S202A, the route selection to adapter 116 is completed in two stages; first, the route cache 152B is used to select a PID steering table based on the D_ID values. For example, $D_k.A_2$ is used to select PID steering table 2 155. $D_k.P_1$ is then used to select port $h_1$ from PID steering table 2 155. Once the port is selected, in block S202B, the frame is routed.

If the frame is destined to fabric switch 138, then the routing is performed in blocks S204A and S204B. In block S204A, the route cache 1523' is used to select a port based on if there is a S_ID 206B match. For example, $D_k.A_1$ in column 161B is used to select port $n_1$. Thereafter, in block S204B, the frame is routed to fabric switch 138.

The embodiments disclosed herein have various advantages. For example, by supporting local storage system 103, one can provide a plurality of servers (for example, 101) and a transparent switch 120 within a single system for easy deployment with very little impact to existing data center components that are connected using fabric switch 138.

Another advantage of the foregoing embodiments is that local attached storage 103 can be used for time critical functions such as system related functions. Because local storage 103 is coupled to switch 120, unnecessary hops are not needed to access the storage. This saves time and is more efficient.

In one embodiment, the foregoing routing techniques also have advantages. For example, using an address range with multiple NPIV data paths, network traffic can be spread out over a plurality of fabric ports while simultaneously supporting shared access to the local storage 103.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A system, comprising:
a computing system operationally coupled to a first switch via a first adapter;
a first storage system coupled to the first switch via a second adapter; and
a second switch operating as a fabric switch and coupled to the first switch and to a second storage system;
wherein the second switch allocates addresses from an address range to the first adapter and the second adapter specifying a domain, area and port identifier value for the first adapter and the second adapter such that the first switch is able to route information between the computing system, the first storage system and the second storage system;
wherein the first switch upon receiving a frame from the second switch uses a dual stage selection mechanism for determining a port for routing the frame to the first storage system and to the computing system;
wherein the dual stage selection mechanism includes a route cache that stores a port identifier group entry corresponding to a destination identifier entry and a plurality of steering tables, where each table entry includes a port identifier associated with a port identifier group entry and each steering table is associated with a domain area value;
wherein based on a destination identifier of the received frame, an associated port identifier group entry from the route cache is selected; a steering table is selected based on a domain area value in the destination identifier of the frame and the port is selected from the steering table based on the port identifier group entry from the route cache; and
wherein the first switch uses a first routing mechanism and a second routing mechanism using N_Port ID Virtualization (NPIV) for selecting a port to route a frame that is received from the computing system, where the first routing mechanism is used to route the frame to the first storage system and the second routing mechanism is used to route the frame to the second storage system.

2. The system of claim 1, wherein the first switch element is configured to receive a frame from the first storage system and depending on information contained within a header for the frame, the first switch uses a source identifier value and a destination identifier value to identify a steering table for selecting an appropriate port for routing the frame.

3. The system of claim 2, wherein the first switch includes a route cache that identifies a port for a frame based on an area value included in the source identifier value.

4. The system of claim 2, wherein the first switch includes an alias cache that identifies a port for a frame based on a domain, an area and a port identifier value included in the destination identifier value.

5. The system of claim 1, wherein the first switch element maintains steering tables associated with specific area values included in the address range and when the frame is received from the second switch, an area value is used to select a steering table from among the steering tables.

6. The system of claim 5, wherein the selected steering table provides a port based on a port identifier value of the frame header.

7. The system of claim 1, wherein the first switch is a transparent switch.

8. The system of claim 1, wherein the fabric switch has a plurality of ports having receive and transmit segments.

9. The system of claim 1, wherein the first adapter is a converged adapter configured to process both network and storage traffic.

10. A first switch operationally coupled to a computing system via a first adapter, to a first storage system via a second adapter and to a second switch operating as a fabric switch and coupled to a second storage system, comprising:
a plurality of ports that are assigned an address range allocated by the first switch specifying a domain, area and port identifier value for the first adapter and second adapter such that the first switch is able to route information between the computing system, the first storage system and the second storage system;
wherein the first switch upon receiving a frame from the second switch uses a dual stage selection mechanism based on an area field for determining a port for routing the frame to the first storage system and to the computing system;
wherein the dual stage selection mechanism includes a route cache that stores a port identifier group entry corresponding to a destination identifier entry and a plurality of steering tables, where each table entry includes a port identifier associated with a port identifier group entry and each steering table is associated with a domain area value;
wherein based on a destination identifier of the received frame, an associated port identifier group entry from the route cache is selected; a steering table is selected based on a domain area value in the destination identifier of the frame and the port is selected from the steering table based on the port identifier group entry from the route cache; and
wherein the first switch uses a first routing mechanism and a second routing mechanism using N_Port ID Virtualization (NPIV) for selecting a port to route a frame that is received from the computing system, where the first routing mechanism is used to route the frame to the first storage system and the second routing mechanism is used to route the frame to the second storage system.

11. The first switch of claim 10, wherein the first switch element is configured to receive a frame from the first storage system and depending on information contained within a header for the frame, the first switch uses a source identifier value and a destination identifier value to identify a steering table for selecting an appropriate port for routing the frame.

12. The first switch of claim 11, wherein the first switch includes a route cache that identifies a port for a frame based on an area value included in the source identifier value.

13. The first switch of claim 11, wherein the first switch includes an alias cache that identifies a port for a frame based on a domain, an area and a port identifier value included in the destination identifier value.

14. The first switch of claim 10, wherein the first switch element maintains steering tables associated with specific area values included in the address range and when the frame is received from the second switch, an area value is used to select a steering table from among the steering tables.

15. The first switch of claim 14, wherein the selected steering table provides a port based on a port identifier value of the frame header.

16. The first switch of claim 10, wherein the first switch is a transparent switch.

17. The first switch of claim 10, wherein the fabric switch has a plurality of ports having receive and transmit segments.

18. The first switch of claim 10, wherein the first adapter is a converged adapter configured to process both network and storage traffic.

19. A method for routing information in a system having a first switch operationally coupled to a computing system via a first adapter, to a first storage system via a second adapter and to a second switch operating as a fabric switch and coupled to a second storage system, comprising:

allocating addresses from an address range to the first adapter and the second adapter such that the first switch is able to route information between the computing system, the first storage system and the second storage system; wherein the second switch allocates the addresses specifying a domain, area and port identifier value for the first adapter and the second adapter;

receiving a frame from the second switch at the first switch;

using a dual stage selection mechanism based on an area field for determining a port for routing the frame to the first storage system and to the computing system;

wherein the dual stage selection mechanism includes a route cache that stores a port identifier group entry corresponding to a destination identifier entry and a plurality of steering tables, where each table entry includes a port identifier associated with a port identifier group entry and each steering table is associated with a domain area value;

wherein based on a destination identifier of the received frame, an associated port identifier group entry from the route cache is selected; a steering table is selected based on a domain area value in the destination identifier of the frame and the port is selected from the steering table based on the port identifier group entry from the route cache; and using a first routing mechanism and a second routing mechanism using N_Port ID Virtualization (NPIV) for selecting a port to route a frame that is received from the computing system, where the first routing mechanism is used to route the frame to the first storage system and the second routing mechanism is used to route the frame to the second storage system.

20. The method of claim 19, wherein the first switch element is configured to receive a frame from the first storage system and depending on information contained within a header for the frame, the first switch uses a source identifier value and a destination identifier value to identify a steering table for selecting an appropriate port for routing the frame.

21. The method of claim 20, wherein the first switch includes a route cache that identifies a port for a frame based on an area value included in the source identifier value.

22. The method of claim 20, wherein the first switch includes an alias cache that identifies a port for a frame based on a domain, an area and a port identifier value included in the destination identifier value.

23. The method of claim 19, wherein the first switch element maintains steering tables associated with specific area values included in the address range and when the frame is received from the second switch, an area value is used to select a steering table from among the steering tables and the selected steering table provides a port based on a port identifier value of the frame header.

* * * * *

UNITED STATES PATENT AND TRADEMARK OFFICE
CERTIFICATE OF CORRECTION

PATENT NO. : 8,706,905 B1
APPLICATION NO. : 12/859690
DATED : April 22, 2014
INVENTOR(S) : Edward C. McGlaughlin Page 1 of 1

It is certified that error appears in the above-identified patent and that said Letters Patent is hereby corrected as shown below:

In the Specification

In column 7, line 5, delete "152E" and insert -- 152B --, therefor.

In column 8, line 28, delete "1523'" and insert -- 152B' --, therefor.

Signed and Sealed this
Fifth Day of August, 2014

Michelle K. Lee
*Deputy Director of the United States Patent and Trademark Office*